(12) United States Patent
Yung

(10) Patent No.: US 6,471,038 B1
(45) Date of Patent: Oct. 29, 2002

(54) CONTAINER CONVEYING APPARATUS

(75) Inventor: Yang Wen Yung, Ta-Li (TW)

(73) Assignee: Chum Power Machinery Corp., Taichung Hsien (TW)

( * ) Notice: Subject to any disclaimer, the term of this patent is extended or adjusted under 35 U.S.C. 154(b) by 14 days.

(21) Appl. No.: 09/654,047

(22) Filed: Sep. 1, 2000

(51) Int. Cl.$^7$ ............................................... B65G 47/90
(52) U.S. Cl. ................................. 198/487.1; 198/803.12
(58) Field of Search ....................... 198/487.1, 803.12, 198/803.15, 803.14

(56) References Cited

U.S. PATENT DOCUMENTS

| | | | |
|---|---|---|---|
| 2,548,683 A | * 4/1951 | Remington et al. | 263/9 |
| 3,955,496 A | * 5/1976 | Urban | 101/40 |
| 4,418,815 A | * 12/1983 | Anderson et al. | 198/476 |
| 4,846,656 A | * 7/1989 | Denis et al. | 425/174.4 |
| 5,857,562 A | * 1/1999 | Evrard | 198/850 |

* cited by examiner

Primary Examiner—Christopher P. Ellis
Assistant Examiner—Rashmi Sharma
(74) Attorney, Agent, or Firm—Troxell Law Office PLLC

(57) ABSTRACT

Container conveying apparatus including: multiple chain elements each of which is formed with a first receiving space, a second receiving space and a connection section spaced from each other; multiple connecting members each having a pivot end and a fixed end, the pivot end being pivotally disposed in the second receiving space of a forward chain element, while the fixed end is connected with the connection section of a rearward chain element. The chain elements are serially connected to form an elongated or an endless chain. Multiple holding structures are disposed in the first receiving spaces of the chain elements and are movable along with the chain elements along a rail. Each holding structure includes a clamping pawl and a push rod movable between first and second positions in the extending direction of the claws. When the push rod is moved from the first position to the second position, the claws are forced outward to tightly bear against the inner wall of the opening of a container positioned under the claws. When the push rod is moved to the first position, the claws are retracted into the first receiving space to release the container.

17 Claims, 5 Drawing Sheets

CONTAINER CONVEYING APPARATUS

BACKGROUND OF THE INVENTION

The present invention relates to a conveying apparatus for holding and conveying containers or bottle blanks, and more particularly to a conveying apparatus including an elongated chain or endless chain composed of multiple chain elements serially connected with each other. A clamping pawl is disposed on each chain element for tightly leaning against the inner wall of the opening of the container so as to hold the container and make the container move in a predetermined direction.

U.S. Pat. No. 5,857,562 discloses a conveying device for conveying preforms. The conveying device includes one single chain capable of holding and conveying the preforms. The chain is composed of multiple plates each having a section on which a holding member is disposed and a section for serially connecting an adjacent plate.

Each mounting plate is formed with a vertical hole and a transverse hole perpendicular to each other. The body of a holding structure is fitted in the vertical hole, while a linking stem of another plate is fitted in the transverse hole. The linking stem extends onto an inner end of the plate and is equipped with a spherical seat portion and a nut, whereby multiple plates together form an endless chain for conveying preforms.

The above chain composed of the plates has some shortcomings as follows:

1. The linking stem must have a longer length to form a certain gap between the outer periphery of two adjacent plates so as not to interfere with the relative swinging of the plates. However, under such circumstance, the elongated linking stem will slide left and right within the transverse-hole so that great noise will be produced in use of the chain due to loosening thereof.

2. The vertical hole and the transverse hole communicate with each other. Therefore, in the above state, once the linking stem moves toward the vertical hole, the nut at the end of the linking stem will abut against the periphery of the body of the holding structure in the vertical hole. This will hinder the movement of the holding structure.

3. The chain is driven only in one specific direction. Such limitation of direction leads to inconvenience in assembly and operation.

4. The spherical seat and the body of the holding structure are together installed in the interior space of the main body. Therefore, when a user wants to replace a worn out spherical seat, it is necessary to totally detach the holding structure for the replacement. Such procedure is quite troublesome.

In addition, the respective holding structures mounted on the plates are used to hold those containers with an opening. The holding structure especially clamps and holds the container at the opening thereof for conveying the container. U.S. Pat. No. 4,846,656 discloses a structure for holding the container. The structure is a shaft rod which can be directly passed through and plugged into the opening of the container. By means of the high frictional coefficient of the surface of the shaft rod, the shaft rod can be fixedly engaged with the inner wall of the opening of the container. Therefore, the container can be drawn and moved along with the shaft rod and a conveying device on which the shaft rod is retained.

When the container is moved along with the shaft rod to pass through a heating device, the shape of the opening of the container will not be over-deformed. However, there are still some shortcomings existing in such structure. First, the structure lacks a withdrawing structure. Therefore, after the held container is processed and moved to another position, it is difficult to release the container from the end of the shaft rod. Second, the shaft rod has fixed outer diameter so that in the case the inner diameter of the opening of the container is slightly different, the shaft rod may be too tightly fitted in the opening and can be hardly detached therefrom or the shaft rod may be too loose to hold the container.

SUMMARY OF THE INVENTION

It is therefore a primary object of the present invention to provide a container conveying apparatus which is movable without limitation of direction and can be pulled or pushed left and right.

It is a further object of the present invention to provide the above container conveying apparatus by which the noise produced in operation is greatly lower than the conventional apparatus.

It is still a further object of the present invention to provide the above container conveying apparatus in which the bearing can be very easily replaced.

It is still a further object of the present invention to provide the above container conveying apparatus which is able to easily hold and release a container.

It is still a further object of the present invention to provide the above container conveying apparatus which is able to firmly hold different containers with different inner diameters of the openings.

It is still a further object of the present invention to provide the above container conveying apparatus in which a Predetermined section is outward expanded to tightly lean against the inner wall of the opening of the container so as to more reliably hold the container.

The present invention can be best understood through the following description and accompanying drawings wherein:

DETAILED DESCRIPTION OF THE PREFERRED EMBODIMENTS

Figure 1:
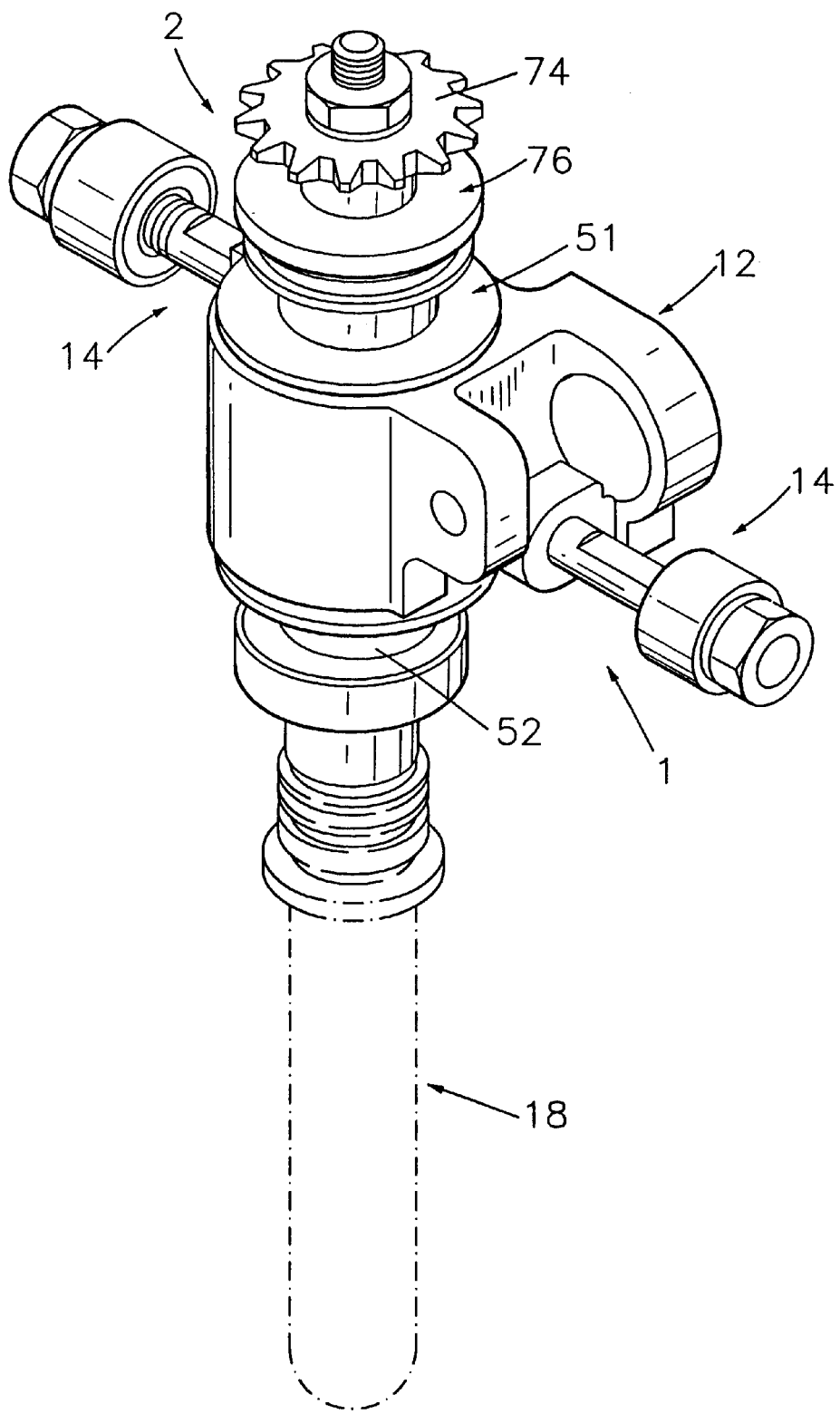
FIG. 1 is a perspective assembled view of a preferred embodiment of the present invention.
Figure 2:
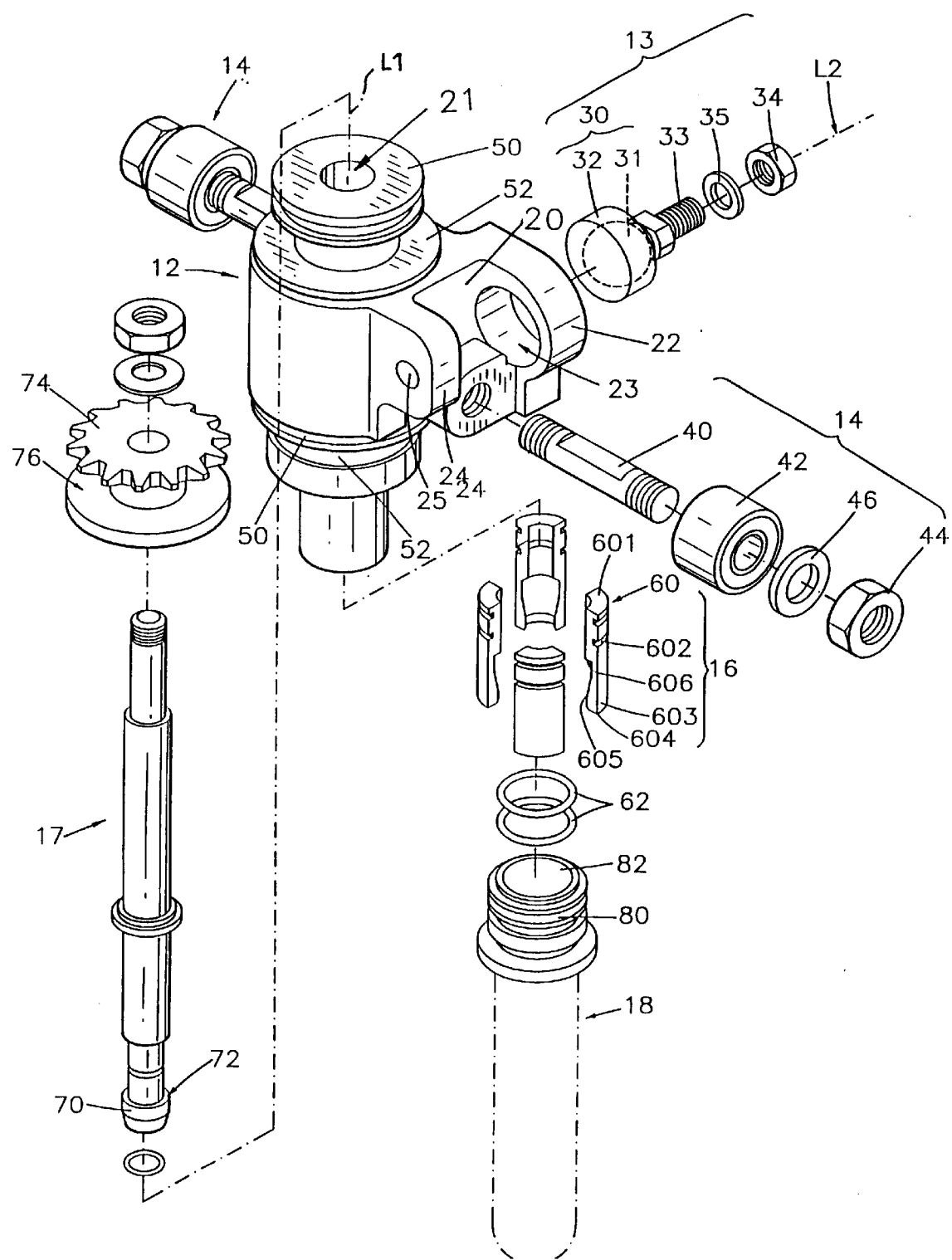
FIG. 2 is a perspective exploded view of the preferred embodiment of the present invention.
Figure 3:
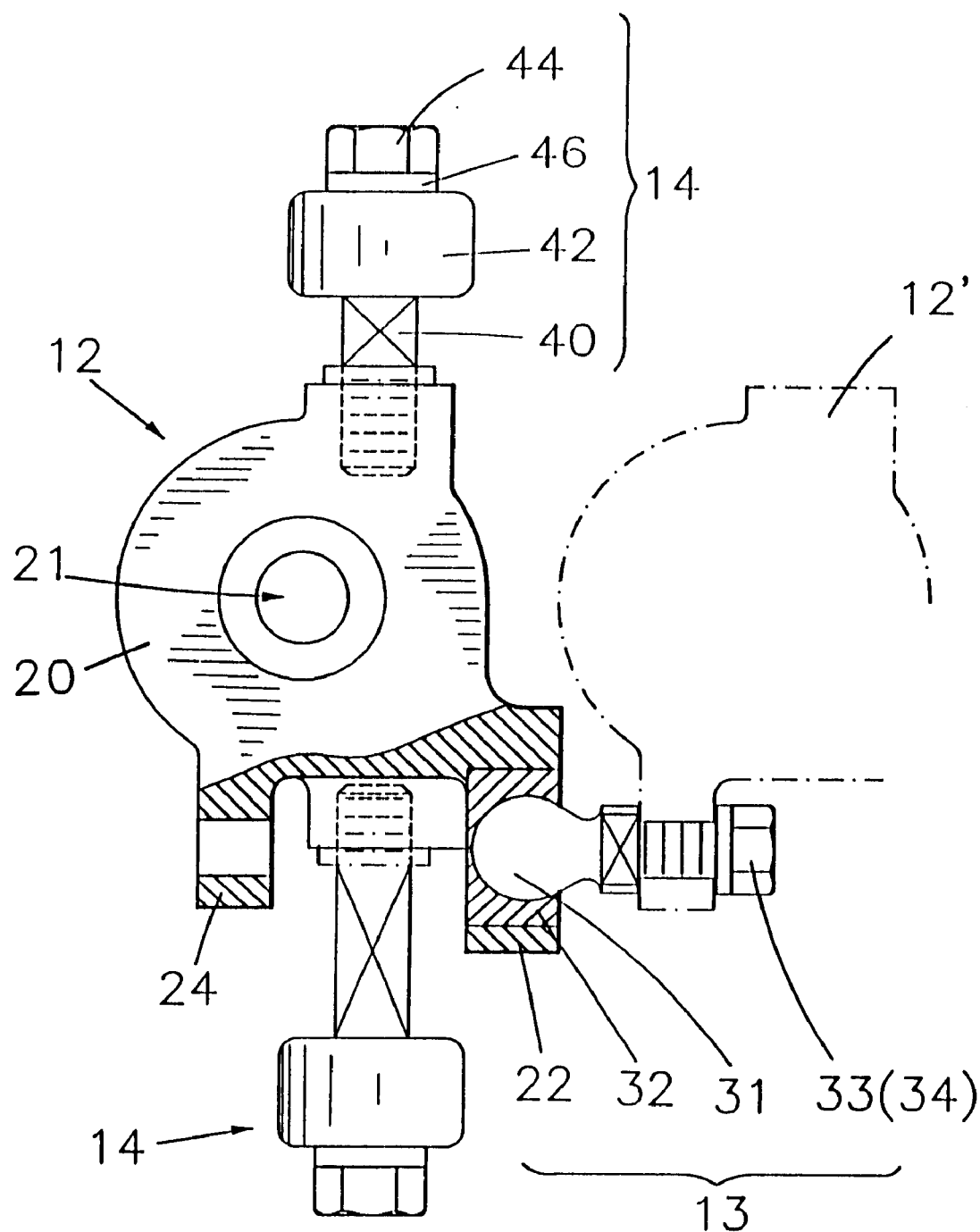
FIG. 3 is a sectional view of the chain element of the preferred embodiment of the present invention.

Please refer to FIGS. 1 to 7. The container conveying apparatus of the present invention includes a chain 1 and multiple holding structures 2 disposed on the chain 1. The chain 1 is composed of multiple chain elements 12 and multiple connecting members 13 connected between two adjacent chain elements 12.

Each chain element 12 includes a main body 20 and first and second parallel lugs 22, 24 extending outwardly from a lateral side of the main body 20 by a certain length. A circular hole-like first receiving space 21 passes through the upper and lower end of the main body 20. The first lug 22 is formed with a circular hole-like second receiving space 23 passing through two sides of the first lug 22. The second lug 24 is formed with a circular hole-like connecting section 25 passing through two sides of the second lug 24. The second receiving space 23 and the connection section 25 are spaced from the first receiving space 21 by a certain distance. The second receiving space 23 is coaxial with the connecting section 25 on a straight line L2 which is substantially normal to the axis L1 of the first receiving space 21.

The connecting member 13 has a certain length and is formed with a pivot end 30 and a fixed end 33. The pivot end 30 has a spherical head section 31 and a bearing seat 32 freely pivotally fitted around the head section 31. The bearing seat 32 is tightly pressed and fitted into the second receiving space 23. The fixed end 33 extends out of the first lug 22.

Multiple pairs of guide members 14 are respectively disposed on two opposite outer sides of the main bodies 20. Each guide member 14 has a shaft rod 40 having an inner end fixed on the main body 20, a roller 42 rotatably fitted on an outer end of the shaft rod 40 and a nut 44 and a washer 46 fixed at outer end of the shaft rod 40 to prevent the roller 42 from detaching therefrom. The two shaft rods 40 on two sides of the main body 20 can be not coaxial. However, the axes of the two shaft rods 40 are still substantially normal to the axes L1, L2 of the first and second receiving spaces 21, 23.

When connecting the multiple chain elements 12 with each other to form the chain 1, the chain elements 12 are sequentially arranged in a direction. The outward extending fixed end 33 of the connecting member of a leftward chain element 12 (in accordance with the direction of FIGS. 3 and 4) is passed through the connecting section 25 of a rightward chain element 12'. Then the fixed end 33 is fixed by a nut 34 and a washer 35. Accordingly, the respective chain elements 12 are serially connected with each other to form a chain 1 without limitation of length. In addition, by means of the freely pivotally connected main body 20 and connecting member 13, the chain 1 can be formed with an annular shape.

In use of the chain 1, the rollers 42 at the ends of the guide members 14 are retained on a pair of parallelly extending rails (not shown) which are spaced from each other by a certain distance, whereby the chain 1 can move or revolve along the rails. During movement of the chain 1, the vibration or swinging thereof is greatly reduced.

According to the above chain composed of the chain elements 12, several advantages are achieved as follows:

1. The connecting member 13 can only swing within the second receiving space 23 and cannot move back or forth. Therefore, the chain can move forward or rearward along the rails with the noise minimized.

2. The first and second receiving spaces 21, 23 respectively for mounting the holding device and connecting member 13 are independent spaces so that when replacing worn out connecting member 13, it is unnecessary to detach the holding device 2 from the first receiving space 21.

Figure 4:
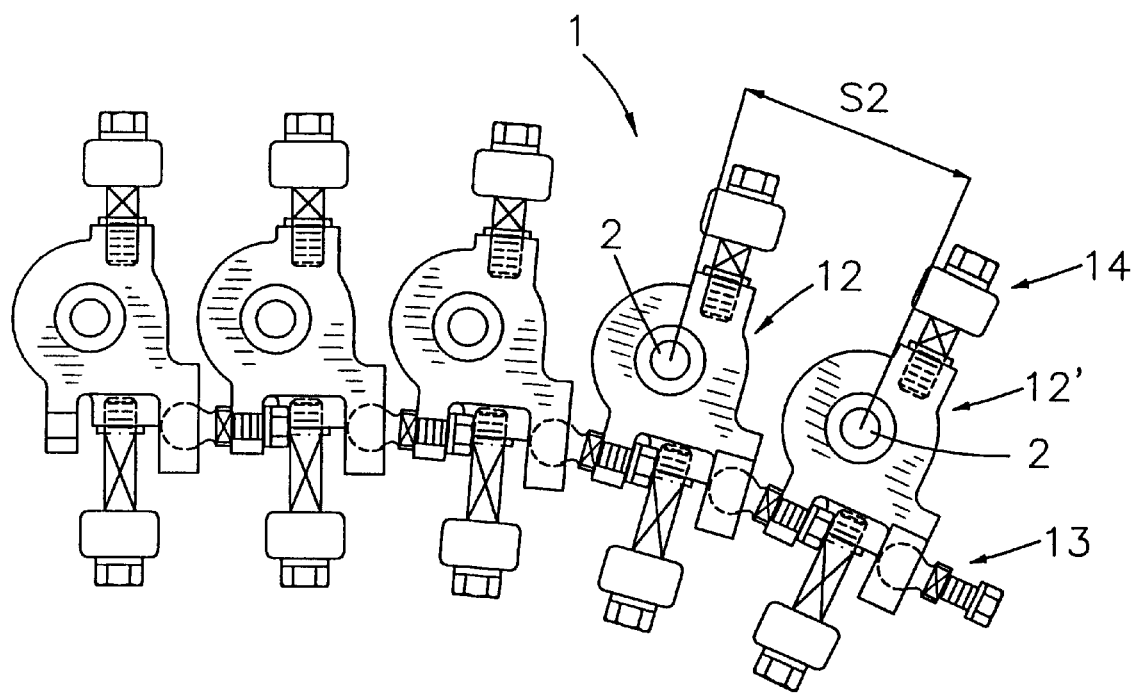
FIG. 4 is a top view of the preferred embodiment of the present invention.

3. The first and second receiving spaces 21, 23 are spaced from each other by a certain distance. Therefore, when the respective chain elements 12 pass through a bight section of the rails (as shown in FIG. 4), the holding devices 2 disposed on two adjacent chain elements 12 are positioned on outer side of the bight section so that the distance S2 between the holding devices 2 is enlarged and it is easier to process the articles (not shown) held by the holding devices 2.

The holding structure 2 is composed of a push rod 17 fitted in the chain element 12 and a clamping pawl 16 driven by the push rod 17. The holding structure 2 serves to clamp and hold a container 18, especially a container 18 having a neck section 80 and formed with an opening 82 at the end of the neck section. (In FIG. 2, a test tube-shaped bottle blank to be blown and patterned is exemplified.)

The chain element 12 has two first rollers 50 respectively disposed at the upper and lower ends of the first receiving space 21. The circumference of each first roller 50 is formed with a first annular guide groove 52. A tubular extension, member 54 is fixed on the lower first roller 50 and downward extends by a certain length.

The clamping pawl 16 is axially reciprocally vertically movably fitted in the extension member 54. The clamping pawl 16 is a cylindrical shape and is composed of four claws 60. Each claw 60 has arch inner and outer edges centered at the axis of the clamping pawl 16. The claw 60 includes a body section 601 with a certain thickness, a pair of grooves 602 formed on the outer edge of the body section 601, a clamping section 603 downward extending from lower end of the body section 601 by a certain length and having an outer face with higher frictional coefficient, a first guide section 604 formed at lower end of outer edge of the clamping section 603 as a guide angle with downward tapered outer diameters, and a second guide section 605 formed on inner face of the clamping section 603 with downward tapered inner diameter. The body section 601 has a thickness larger than the thickness of upper end of the second guide section 605 so that a first shoulder section 606 is formed at an adjoining section between the body section 601 and the second guide section 605.

A pair of slightly resilient binding rings 62 are fitted around the body sections 601 of the claws 60 and inlaid in two annular grooves formed by the serially-connected grooves 602. The binding rings 62 serve to bind the four claws 60 together in a cylindrical form.

The push rod 71 is fitted in the first receiving space 21 and the clamping pawl 16 and can be reciprocally up and down moved between a first and a second positions in a direction of the axis of the first receiving space 21. The push rod 17 is formed with a slide block 70 corresponding to the inner side of the clamping sections 603 of the claws 60. The outer circumference of the slide block 70 has a thrust shape corresponding to the second guide section 605. The push rod 17 is further formed with an annular second shoulder section 72 formed on upper edge of the slide block 70 corresponding to the first shoulder section 606. The push rod 17 is further formed with an annular third shoulder section positioned above the second shoulder section 72 and facing downward. The upper end of the push rod 17 extends out of the upper end of the first receiving space 21 and fixed with a second roller 74. The upper end of the second roller 74 is formed as a gear. A middle portion of the second roller 74 is formed with a second guide groove 76.

When the holding structure 2 holds a container 18, a first and a second rails (not shown) are first respectively inlaid into the corresponding first and second guide grooves 52, 76. Substantially, the first rail is positioned right under the second rail. The first rail extends on a plane face, while a predetermined range of the second rail is waved to enlarge the distance between the first and second rails.

Figure 5:
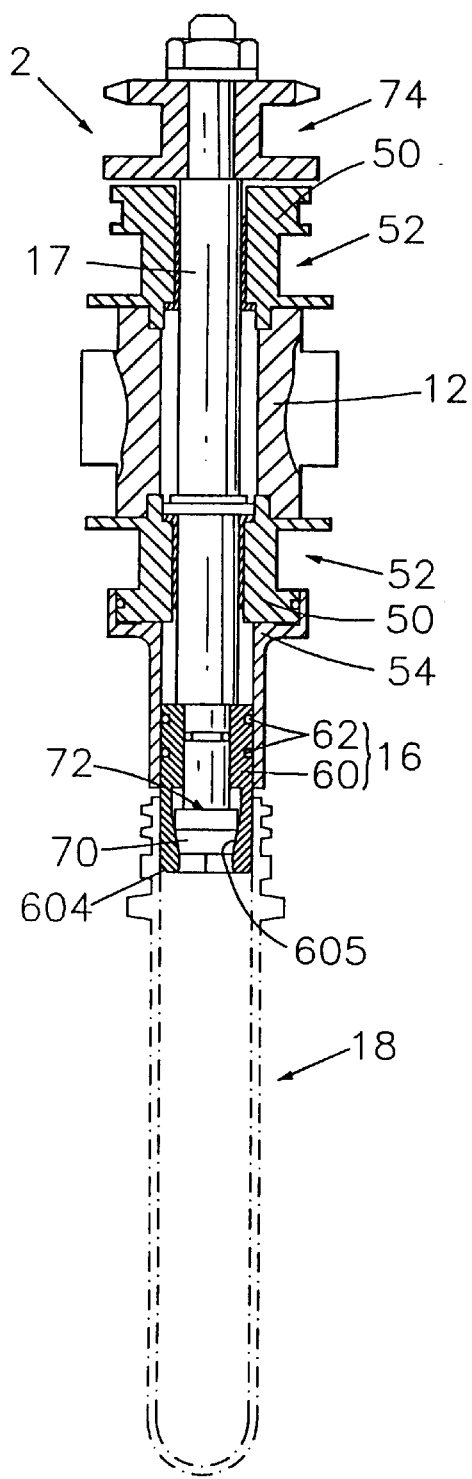
FIG. 5 is a sectional view of the preferred embodiment of the present invention in one state.

When the distance between the two rails is enlarged, the push rod 17 moving along the second rail will be driven upward to move to a first position (as shown in FIG. 5) via the second guide groove 76 and the second roller 74. At the same time, the slide block 70 via the second shoulder section 72 thereof pushes the first shoulder section 606 to force the clamping pawl 16 to move upward along therewith.

Figure 6:
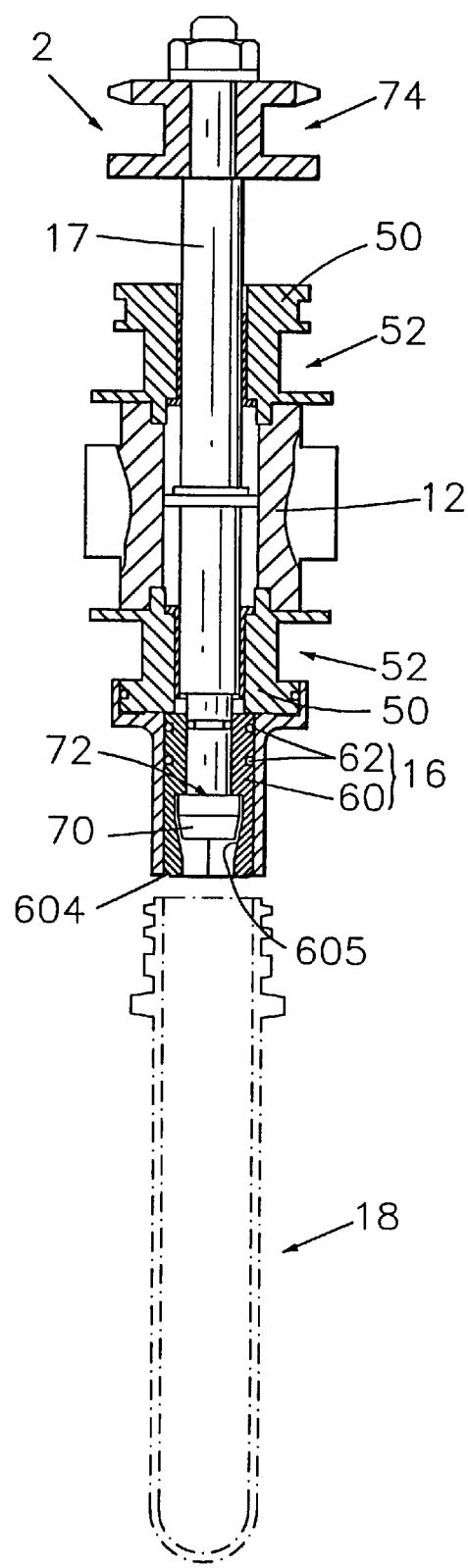
FIG. 6 is a sectional view of the preferred embodiment of the present invention in another state.

When the two rails get closer to each other, the push rod 17 is driven downward to move to a second position as shown in FIG. 6. The slide block 70 moving downward along therewith via the second guide section 605 pushes the clamping pawl 16 to move downward along therewith and makes the lower ends of the claws 60 downward protrude out of the lower end of the extension member 54. At the same time, under guiding of the first guide sections 604, the ends of the claws 60 will enter the opening 82 of a container 18 positioned under the chain element 12. The clamping sections 603 are all forcedly expanded outward by the slide block 70. Under such circumstance, the outer edges of the claws 60 will tightly lean against the inner wall of the neck section 80 of the container so as to firmly hold the container.

When the holding structure 2 moves along with the chain 1 again to a position where the two rails are spaced by a larger distance, the push rod 17 will be restored to the first position on upper side. At this time, the, clamping sections 603 are no-more forcedly expanded outward so that the container 18 is released. During the continuous upward movement of the push rod 17, not only the slide block 70 will no more further forcedly expand the claws 60 outward, but also the slide block 70 will via the second shoulder section 72 pushes the first shoulder section 606 to drive the respectively claws 60 to move upward along therewith and retract into the extension member 54. In addition, the lower edge of the extension member 54 will stop the upper end of the container 18 from moving upward along with the clamping pawl 16 and make the container 18 remain under the chain element 12. Therefore, the container 18 is forcedly separated from the holding structure 2.

Figure 7:
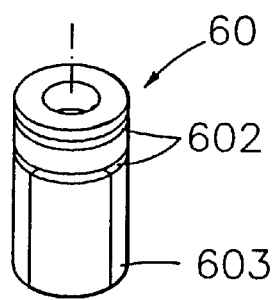
FIG. 7 is a perspective view of another embodiment of the clamping pawl of the present invention.

The four claws 60 each having a body section 601 and a clamping section 603 are bound into a cylindrical clamping pawl 16 of the holding structure 2. However, in practical application, alternatively, the four body sections 601 can be integrally formed as a cylindrical shape (as shown in FIG. 7). The plate-like clamping sections 603 downward extending from the lower edge of the cylindrical body section by a certain length and are spaced from each other by a certain gap.

According to the above arrangement, the present invention has at least three advantages as follows:

1. In holding state, the slide block 70 forcedly outward expands the claws 60 to tightly lean against the inner wall of the neck section 80 of the container. This achieves a holding effect more reliable than the conventional structure.

2. When releasing the container 18, the clamping sections 603 for clamping the container 18 can be swung inward and upward retracted into the extension section 54 of the chain element 12. Therefore, the clamping sections 603 can be totally disengaged from the inner wall of the neck section 80 of the container so that the container 18 can be totally separated from the holding structure 2.

3. Within the application range, the clamping sections 603 of the claws 60 can be swung relative to the axis within a certain range. Therefore, it is unnecessary to change the structure or shape of the clamping pawl 16 and the clamping pawl 16 can hold various kinds of containers 18 having neck sections 80 with slightly different inner diameters.

The above embodiments are only used to illustrate the present invention, not intended to limit the scope thereof.

Many modifications of the above embodiments can be made without departing from the spirit of the present invention.

What is claimed is:

1. A container conveying apparatus comprising an elongated chain composed of multiple chain elements serially connected with each other, each chain element including:

a main body including a first receiving space, a second receiving space and a connecting section, the first and second receiving spaces being spaced from each other by a predetermined distance, axes of the first and second receiving spaces being normal to each other, axes of the connecting section and the second receiving space being positioned on a same line; and a connecting member having a rod body section and a pivot end and a fixed end at two ends of the body section, the pivot end being pivotally disposed in the second receiving space, the fixed end protruding out of the main body by a predetermined length for connecting with the connecting section of another main body, wherein the main body has first and second lugs spaced from each other by a predetermined distance, the second receiving space being a first through hole having a predetermined inner diameter and formed in the first lug and passing therethrough, the connecting section being a second through hole having a predetermined inner diameter and formed on the second lug and passing therethrough.

2. The container conveying apparatus as claimed in claim 1, wherein the pivot end of the connecting member has a spherical head section pivotally inlaid in a bearing seat, the bearing seat being tightly inserted in the second receiving space.

3. The container conveying apparatus as claimed in claim 1, further comprising a pair of guide members disposed on opposite sides of the main body for mounting the main body on a rail.

4. The container conveying apparatus as claimed in claim 3, wherein each guide member has a shaft rod, an inner end of the shaft rod being fixed on the main body, and a roller being rotatably disposed on an outer end of the shaft rod.

5. The container conveying apparatus as claimed in claim 4, wherein an axis of the shaft rod is normal to the axes of the first and second receiving spaces.

6. The container conveying apparatus as claimed in claim 4, wherein axes of the shaft rods are spaced from each other by a predetermined distance.

7. The container conveying apparatus as claimed in claim 1, further comprising
   a clamping pawl disposed at one end of each chain element, the clamping pawl being hollow and having a plurality of claws, a predetermined portion of each claw being formed with a clamping section adapted to bear against an inner wall of a container, the clamping section being outwardly swingable by a predetermined amplitude relative to an axis of the clamping pawl; and a push rod fitted in the chain element and the clamping pawl driving the clamping pawl to axially reciprocally move between first and second positions, whereby when the push rod is moved from the first position to the second position, the clamping sections of the claws are forced to protrude out of the chain element and outwardly expand.

8. The container conveying apparatus as claimed in claim 7, wherein the chain element and the push rod are respectively movable along two independent rails spaced from each other by a certain distance.

9. The container conveying apparatus as claimed in claim 8, wherein the two rails are spaced from each other by at least two different distances.

10. The container conveying apparatus as claimed in claim 7, wherein a predetermined portion of each chain element has a first guide groove and the push rod has a second guide groove positioned outside the main body, the first and second guide grooves being respectively movable along two independent rails spaced from each other by at least two different distances.

11. The container conveying apparatus as claimed in claim 7, wherein an outer edge of the end of the clamping section which protrudes out of the chain element has a thrust-shaped first guide section.

12. The container conveying apparatus as claimed in claim 7, wherein an inner edge of the clamping section has a thrust-shaped guide section, an outer edge of the end of the push rod having a shape corresponding to the guide section, whereby when the push rod is moved to the second position, the outer edge of the end of the push rod pushes the claws to outwardly move from the chain element to outwardly expand the clamping sections.

13. The container conveying apparatus as claimed in claim 12, wherein the inner edge of the clamping pawl has a first shoulder section and the end of the push rod has a second shoulder section engaged with the first shoulder section, whereby when the push rod is moved to the first position, the second shoulder section pushes the first shoulder section to force the clamping pawl to move along therewith.

14. The container conveying apparatus as claimed in claim 7, wherein the clamping pawl comprises at least two claws, each claw having a body section always positioned in the chain element and a clamping section extensible out of the chain element, outer edges of the body section and the clamping section being arched.

15. The container conveying apparatus as claimed in claim 14, wherein the outer edge of the each body section has a groove, whereby the grooves of the body sections can be serially connected with each other to form an annular groove, a resilient binding ring being fitted in the annular groove.

16. The container conveying apparatus as claimed in claim 7, wherein an outer edge of the clamping section has a portion with higher frictional coefficient than other portions.

17. The container conveying apparatus as claimed in claim 7, wherein the clamping pawl has a cylindrical body section and the claws are plate-like and spaced from each other, the claws respectively axially extending from an end edge of the body section by a predetermined length.

* * * * *